(12) United States Patent
Lee

(10) Patent No.: US 7,263,098 B2
(45) Date of Patent: Aug. 28, 2007

(54) AAL2 SWITCH FOR MULTICAST IN MOBILE COMMUNICATION SYSTEM AND SWITCHING METHOD

(75) Inventor: Byung Cheon Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 950 days.

(21) Appl. No.: 10/020,872

(22) Filed: Dec. 19, 2001

(65) Prior Publication Data

US 2002/0080788 A1 Jun. 27, 2002

(30) Foreign Application Priority Data

Dec. 21, 2000 (KR) ................. 2000-79555

(51) Int. Cl.
*H04L 12/28* (2006.01)
(52) U.S. Cl. .................. 370/390; 370/310.1; 370/349; 370/432
(58) Field of Classification Search ............ 370/310.1, 370/390, 310.2, 338, 349, 432, 466, 469, 370/395.6
See application file for complete search history.

(56) References Cited

U.S. PATENT DOCUMENTS

| | | | | |
|---|---|---|---|---|
| 5,572,522 A * | 11/1996 | Calamvokis et al. | ....... | 370/390 |
| 5,689,506 A * | 11/1997 | Chiussi et al. | ............. | 370/388 |
| 5,963,552 A * | 10/1999 | Joo et al. | ............... | 370/395.32 |
| 6,031,838 A * | 2/2000 | Okabe et al. | ........... | 370/395.6 |
| 6,434,151 B1 * | 8/2002 | Caves et al. | ............ | 370/395.2 |
| 6,480,492 B1 * | 11/2002 | Lundback et al. | ....... | 370/395.1 |
| 6,522,647 B1 * | 2/2003 | Czajkowski et al. | ........ | 370/356 |
| 6,574,224 B1 * | 6/2003 | Brueckheimer et al. | . | 370/395.6 |
| 6,587,465 B1 * | 7/2003 | Dempo | ..................... | 370/395.1 |
| 6,594,267 B1 * | 7/2003 | Dempo | ................... | 370/395.64 |
| 6,597,696 B1 * | 7/2003 | Toyama et al. | ........ | 370/395.31 |
| 6,597,698 B1 * | 7/2003 | Lundback et al. | .......... | 370/398 |
| 6,603,767 B1 * | 8/2003 | Murakami et al. | ..... | 370/395.64 |
| 6,621,821 B1 * | 9/2003 | Song | ....................... | 370/395.6 |
| 6,636,510 B1 * | 10/2003 | Lee et al. | .................... | 370/390 |
| 6,639,916 B1 * | 10/2003 | Wakizaka | .................... | 370/397 |
| 6,741,598 B1 * | 5/2004 | Murakami et al. | ........ | 370/395.6 |
| 6,747,974 B1 * | 6/2004 | Hayashi | .................... | 370/395.1 |
| 6,781,993 B1 * | 8/2004 | Takechi et al. | .......... | 370/395.1 |
| 6,931,012 B2 * | 8/2005 | Karlsson et al. | ....... | 370/395.31 |
| 7,116,658 B1 * | 10/2006 | Almalki | ..................... | 370/356 |
| 2003/0026266 A1 * | 2/2003 | Choi | ..................... | 370/395.64 |

* cited by examiner

*Primary Examiner*—Seema S. Rao
*Assistant Examiner*—Andrew C. Lee
(74) *Attorney, Agent, or Firm*—Ked & Associates, LLP

(57) ABSTRACT

The present invention relates to an AAL switch for multicast and a switching method for performing a flexible multicast connection. An AAL2 switch for multicast and a switching method for performing a flexible multicast connection can be used in applications like video conference and video on demand. An AAL2 switch can include a plurality of receiver circuits that convert an AAL2 packet into a CPS packet by demultiplexing, a plurality of storing devices that store a CPS packet separated from the AAL2 packet, and a plurality of transmitter circuits that periodically search the plurality of storing device and convert the searched CPS packet into an outgoing AAL2 packet by multiplexing. The transmitter circuits can transmit the outgoing AAL2 packet.

21 Claims, 5 Drawing Sheets

Fig. 5A

| Input | Output |
|---|---|
| VPVC & CID # 1 | New VPVC # 1 & Routing Tag # 1 |
| VPVC & CID # 2 | New VPVC # 2 & Routing Tag # 2 |
| VPVC & CID # 3 | New VPVC # 3 & Routing Tag # 3 |
| ⋮ | ⋮ |
| VPVC & CID # N-1 | New VPVC # N-1 & Routing Tag # N-1 |
| VPVC & CID # N | New VPVC # N & Routing Tag # N |

Fig. 5B

| Input | Output |
|---|---|
| New VPVC # 1 | New CID # 1 |
| New VPVC # 2 | New CID # 2 |
| New VPVC # 3 | New CID # 3 |
| ⋮ | ⋮ |
| New VPVC # N-1 | New CID # N-1 |
| New VPVC # N | New CID # N |

AAL2 SWITCH FOR MULTICAST IN MOBILE COMMUNICATION SYSTEM AND SWITCHING METHOD

BACKGROUND OF THE INVENTION

1. Field of the Invention

The present invention relates to an ATM adaption layer (AAL) switch in a mobile communication system, and more particularly to a switching method and an AAL2 type AAL switch for multicast.

2. Background of the Related Art

An AAL2 switch is one of the core technologies of IMT-2000, which combines ATM signals for efficient use of broadband width in an ATM network that is used as a transmission path between stations using IMT-2000, i.e., a base station, base station controller and mobile switching center. FIG. 1 is a block diagram of a related art ATM switch system.

Referring to FIG. 1, the related art ATM switch system includes an AAL2 receiving end 11, an ATM switch 12, and an AAL2 transmitting end 13. An AAL2 packet is demultiplexed by the AAL2 receiving end 11, and the AAL2 packet is converted into an ATM cell of 53 bytes having an internal format. The converted ATM cell, i.e., the common part sublayer packet (CPS) is switched by the ATM switch 12, and reverse-converted into the AAL2 CPS packet from the internal format, and multiplexed by the AAL2 transmitting end 13 to be transmitted to a destination.

As described above, the ATM switch 12 does not switch the AAL2 packet immediately or directly, but first has to convert the AAL2 packet into an ATM cell using the internal format. Further, when performing the switching at an ATM level, the related art ATM switching system cannot achieve the AAL2 multicast switching due to the CPS packet in a multiplexed state.

As described above, the related art ATM switch system has various disadvantages. As shown in FIG. 1, in the related art ATM switching system, the AAL2 packet has to be converted into CPS packet by the internal format. After the switching, the converted CPS packet has then to be re-converted into AAL2 CPS packet. Such an overhead causes service quality deterioration and efficiency deterioration such as delayed transmission of cells. Further, many manufacturers develop proprietary or use their own internal formats such as AAL2 and AAL5. Further, since the related ATM switch system cannot support the multicast function of multiplexed AAL2, it is impossible to apply the system to the 3-G mobile communication system like the IMT-2000. In the related art ATM switch system, since the ATM cell multiplexed into AAL2 packet has a plurality of user information, the AAL2 packet has to be divided into CPS packets to be copied into a plurality of cells. Accordingly, there have been increasing demands and a need exists for an AAL2 switch for multicast, which will achieve a more efficient communication system and increase or maximize the traffic transmission efficiency.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an ATM adaption layer (AAL) switch for multicast and a switching method thereof that improves an existing ATM switch for multicast.

Another object of the present invention is to provide an AAL switch for multicast and a switching method thereof that improves an existing AAL2 switch for unicast.

Another object of the present invention is to provide an AAL switch for multicast and a switching method thereof in a mobile communication system that increases traffic efficiency rates.

Another object of the present invention is to provide an AAL2 switch for multicast and a switching method thereof for performing a multicast connection in applications like video conference or video on demand (VOD) in an IMT-2000 system.

Another object of the present invention is to provide an AAL2 switch for multicast and a switching method thereof in a 3-G mobile communication system that increases or maximizes traffic efficiency rates by improving an existing ATM switch for multicast or AAL2 switch for unicast.

To achieve at least the above objects in a whole or in part, there is provided an AAL2 switch for multicast in a mobile communication system, the switch includes a plurality of receiver circuits each receiving and demultiplexing an AAL2 packet for converting into at least one CPS packet, a plurality of memories that store the at least one CPS packet, and a plurality of transmitter circuits each coupled to the plurality of memories that search the plurality of memories, convert the searched CPS packet into an AAL2 packet by multiplexing, and transmit the AAL2 packet.

To further achieve the above objects in a whole or in part, there is provided a switching method of an AAL2 switch for multicast in a mobile communication system, the method including converting a received AAL2 packet into a CPS packet by demultiplexing the received AAL2 packet, generating a new VPVC and routing information based on VPVC and CID in the received AAL2 packet, storing the CPS packet and the new VPVC according to the routing information in at least one of a plurality of storage areas in a memory, extracting the CPS packet by searching the plurality of storage areas, and transmitting an AAL2 packet by converting the extracted CPS packet into an AAL2 packet and transmitting the AAL2 packet.

To further achieve the above objects in a whole or in part, there is provided a switching method of an AAL switch for multicast in a mobile communication system, the method including converting a received AAL2 packet into a CPS packet by demultiplexing the received AAL packet, storing the CPS packet according to a routing information, converting the stored CPS packet into an AAL packet, and transmitting the AAL packet.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 5a and 5b are diagrams that show exemplary first and second tables shown in FIG. 2, respectively.

DETAILED DESCRIPTION OF PREFERRED EMBODIMENTS

Preferred embodiments of ATM adaption layer (AAL) switches and Switching methods for multicast in a communication system according to the present invention will now be described with reference to the accompanying drawings. In the description, matters defined such as detailed constructions and elements of circuits are exemplary ones provided with respect to preferred embodiments to assist in a comprehensive understanding of the present invention. Thus, it is apparent that the present invention can be carried out without such defined matters. Further, well-known functions or constructions are not described in detail since they would be known to one of ordinary skill in the art.

Figure 1:
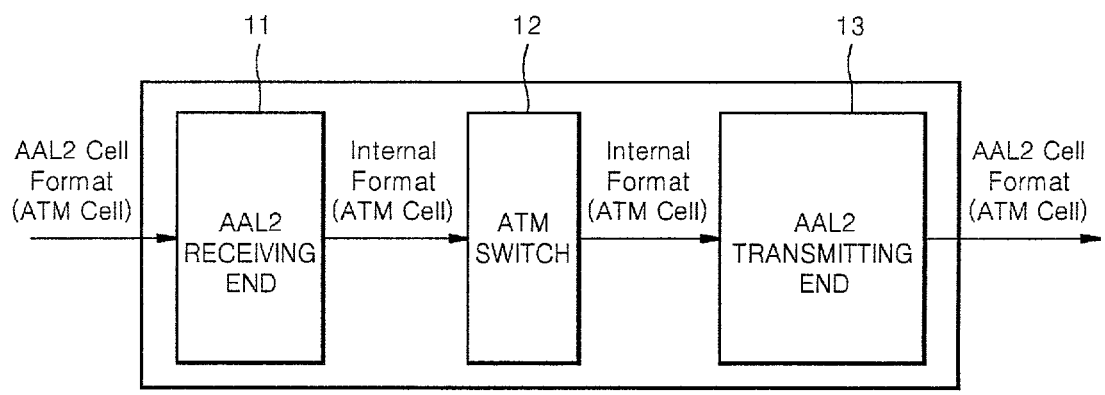
FIG. 1 is a block diagram of a related art ATM switching system.
Figure 2:
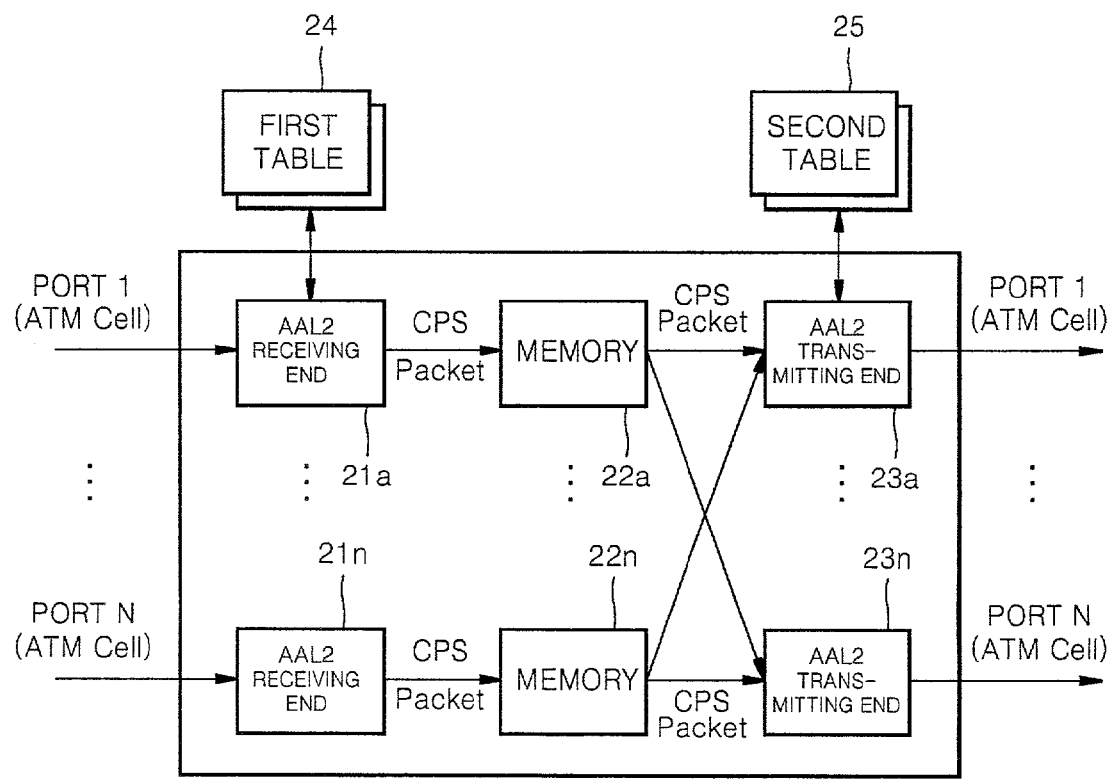
FIG. 2 is a block diagram that shows a preferred embodiment of an AAL2 switch for multicast according to the present invention.

FIG. 2 is a block diagram that shows a preferred embodiment of a AAL2 switch for multicast according to the present invention. As shown in FIG. 2, the AAL2 switch includes a plurality of AAL2 receiving ends 21a-21n, a plurality of memories 22a-22n and a plurality of AAL2 transmitting ends 23a-23n. Further, the AAL2 switch can include a first table 24 and a second table 25.

The AAL2 receiving ends 21a-21n are coupled to respective input ports (e.g., input PORT1-PORTN), and preferably demultiplex an ATM cell of 53 bytes, which is a multiplexed form of an AAL2 CPS packet. Thus, an AAL2 receiving end (such as the AAL2 receiving end 21a) of the AAL2 receiving ends 21a-21n can separate a CPS packet from the AAL2 packet inputted through each port of the input ports. The AAL2 receiving end 21a transmits a CPS packet to the memory 22a according to a new virtual path virtual circuit (VPVC) and a routing tag preferably determined in the first table 24 (e.g., see FIG. 5a) where the new VPVC and the routing tag are allocated responding to VPVC and channel identifier (CID) of the AAL2 inputted through the input ports. The routing tag preferably means a start point of each storage area or location in memory. Based on the routing tag as shown in FIG. 2, the AAL2 receiving end 21a stores the CPS packet into the memory 22a that is coupled to the AAL2 receiving end 21a. Storage areas (i.e., addresses), which preferably correspond to the output ports in number, can be allocated in the memory 22a in advance. Accordingly, based on the routing tag, the CPS packet determined in the AAL2 receiving end 21-21n can be stored in one of the pre-allocated addresses of the corresponding memory 22a-22n. Meanwhile, the new VPVC can also be stored in the corresponding memory 22a-22n (e.g., memory 22a) when the CPS packet is stored.

The plurality of memories 22a-22n are preferably coupled to the plurality of AAL2 receiving ends 21a-21n in an one-to-one basis, and can store the CPS packet and the VPVC transmitted from the AAL2 receiving ends 21a-21 n. The memories 22a-22n will now be described in additional detail.

Figure 3:
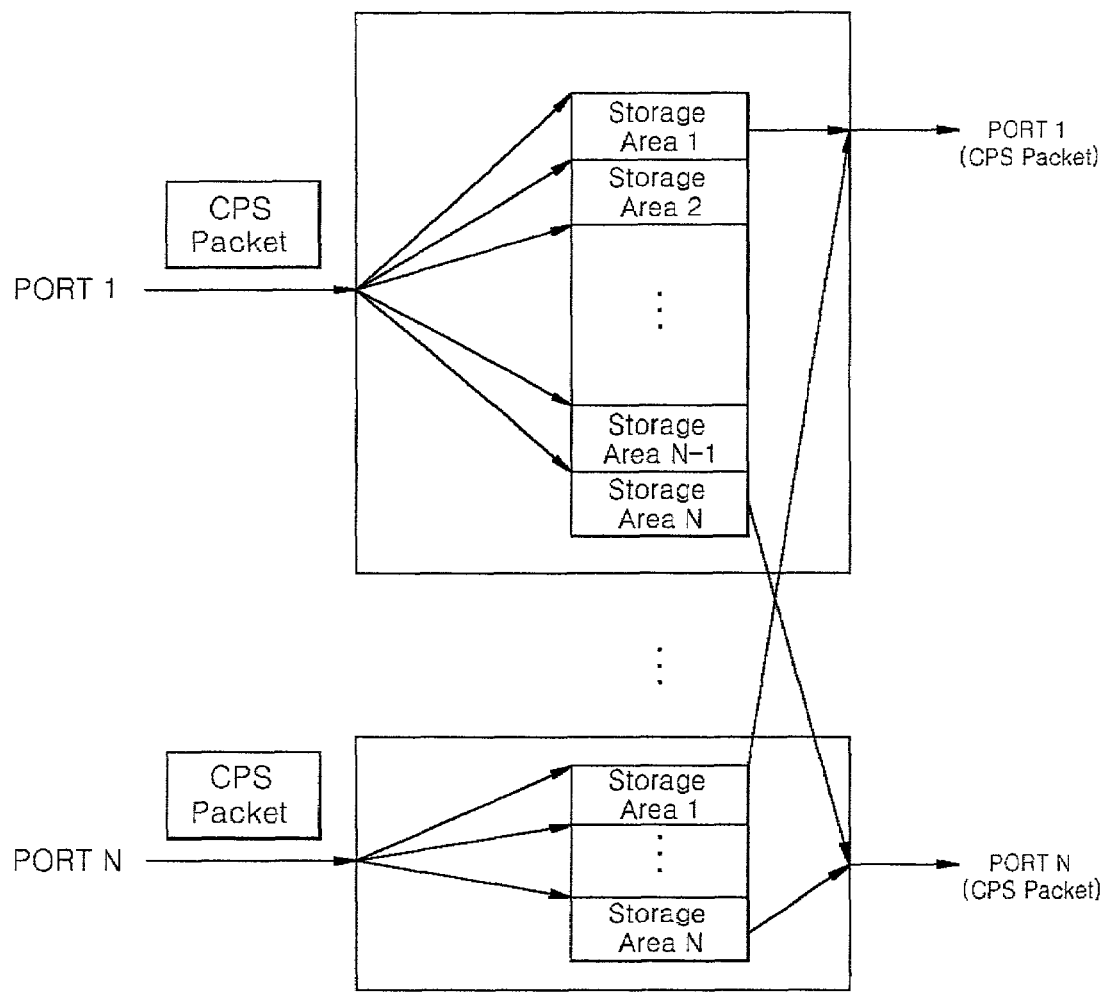
FIG. 3 is a block diagram that shows an internal structure of a memory shown in FIG. 2.

FIG. 3 is a block diagram showing an exemplary internal structure of memory in the preferred embodiment of a AAL2 switch for multicast. The memory as shown in FIG. 3 means one of the memories preferably existing equal in number to a number of output ports. As shown in FIG. 3, a memory such as the memory 22a can be divided into a plurality of storage areas each preferably including a memory status field, a copy port field and a port area. The memory status field preferably indicates whether the CPS packet is stored in the memory (e.g., the memory 22a) or not. For example, if the CPS packet and VPVC are stored in the memory 22a, a prescribed value such as "1" is set in the memory status field of the corresponding storage area. The copy port field preferably indicates the output port where the copied CPS packet is transmitted for multicast. For example, if the CPS packet for multicast is intended to be sent to the output ports 3, 8, 14 and 27, a value such as "1" can be set in each bit of the copy port field that corresponds to the output ports 3, 8, 14 and 27. Each bit of the copy field can correspond to an output port to indicate each of the output ports to which the CPS packet is transmitted. Also, the CPS packet and the new VPVC information can preferably be stored on the port area corresponding to the bit of '1' set from the copy port field.

Figure 4:
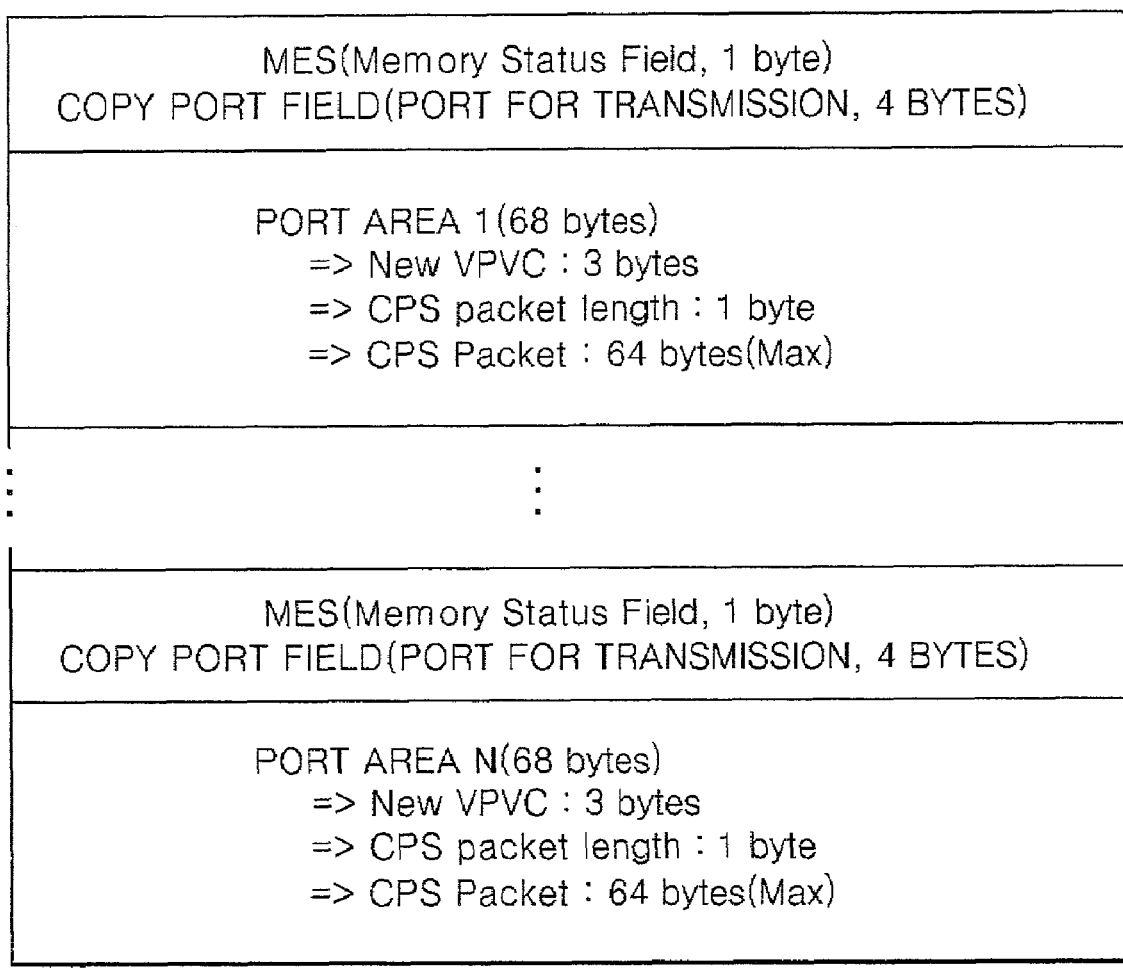
FIG. 4 is a diagram that shows a structure of an allocated memory shown in FIG. 2.

FIG. 4 is a diagram showing an exemplary construction for allotting addresses or storage areas in memory in the preferred embodiment of a AAL2 switch for multicast. As shown in FIG. 4, the memory (e.g., memories 22a-22n) has storage areas corresponding to output ports (output PORT1-PORTN) in number. In each of storage areas, the memory status field, the copy port field and the port area can be separately included. To support one switch port, each of storage areas can be preferably allocated in total 73 bytes, which includes 68 bytes of port area, 1 byte of memory status field and 4 bytes of copy port field. As shown in FIG. 3, storage areas are allocated in number corresponding to the number of the output ports, because when the CPS packet is for multicast, the CPS packet has to be copied and stored in the respective ports through which the packet is intended to be transmitted, and the CPS packet has to be searched and transmitted by the AAL2 transmitting end 23a. The memory status field preferably includes 1 byte intended to indicate whether the CPS packet is stored or not. The copy port field indicates area to which the CPS packet for multicast should be copied and transmitted. The port area can include 3 bytes of a new VPVC, 1 byte of CPS packet length and an allocation or maximum 64 bytes for the CPS packet. A DPRAM (Dual Port RAM) or the like can be used as the memory 22a-22n.

As shown in FIG. 2, the plurality of AAL2 transmitting ends 23a-23n preferably search or search periodically based on the memory status field whether there are CPS packets stored for the respective memories 22a-22n. As described above, the CPS packet transmitted from the AAL2 receiving end 21a can be stored in the corresponding memory 22a. For example, to indicate that the CPS packet is stored, '1' is preferably set in the memory status field of the memory 22a. Accordingly, the AAL2 transmitting end 23a searches each of the plurality of memories 22a-22n to determine whether '1' is set in the memory status fields. When there is '1' set in the memory status field, the CPS packet stored in the corresponding memory 22a can be extracted. If the CPS packet is for multicast, in addition to the memory status field, the AAL2 transmitting end 23a also searches the copy port field to determine whether the copy port field area is set at '1' for its corresponding output port PORT1. When the copy port field is set at '1', the AAL2 transmitting end 23a confirms the output port to which it is coupled and extracts the CPS packet stored in a corresponding port area at this time. The AAL2 transmitting end 23a can then transmit the AAL2 packets preferably by multiplexing the extracted CPS packet based on the new VPVC and a new CID preferably allocated in the second table 25 or the like.

Figure 6:
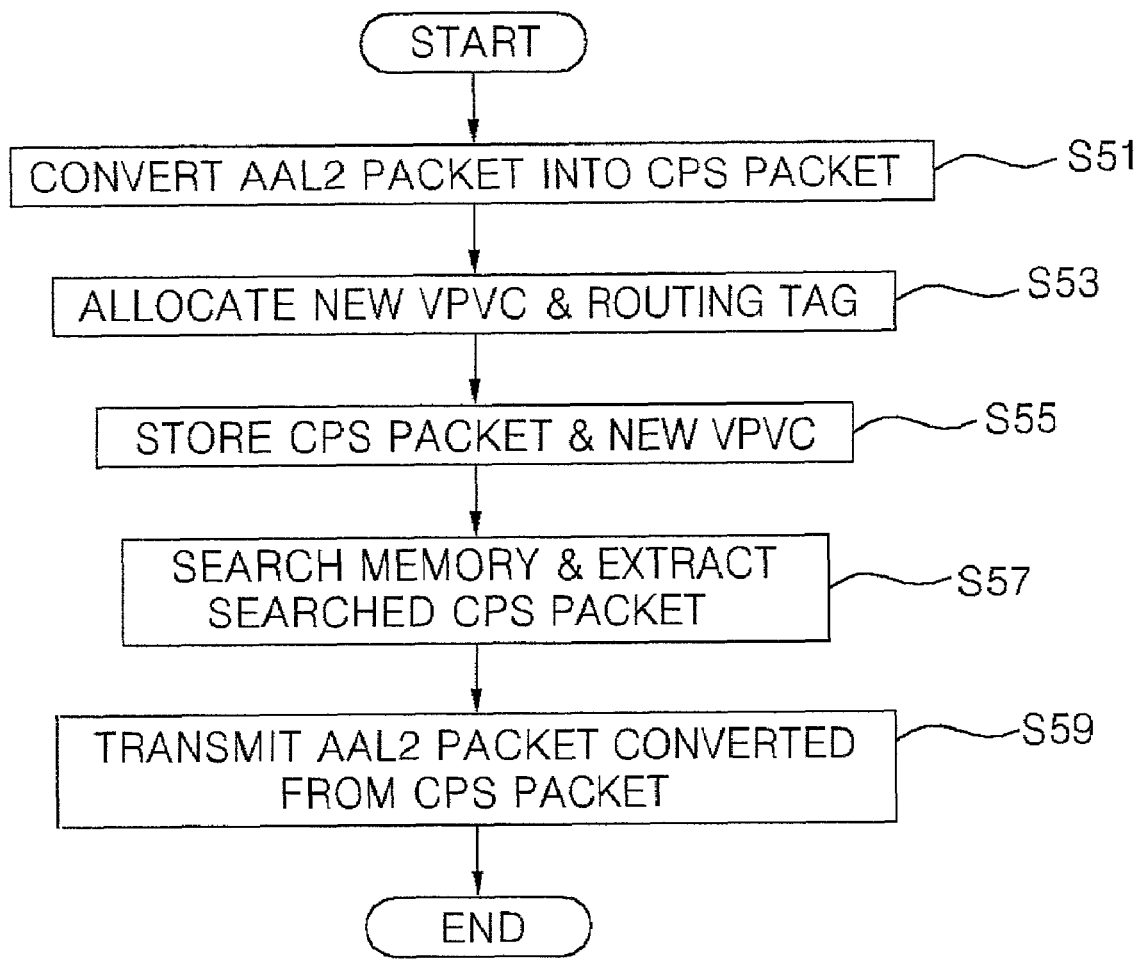
FIG. 6 is a flowchart that shows a preferred embodiment of an AAL2 switching method according to the present invention.

FIG. 6 is a flowchart that shows a preferred embodiment of an AAL switching method according to the present invention. For example, the preferred embodiment of an AAL switching method can be used in the preferred embodiment of a AAL2 switch for multicast as shown in FIG. 2. As shown in FIG. 6, after a process starts, when an AAL2 packet is inputted to one of a plurality of AAL2 receiving ends (e.g., AAL2 receiving end 21a-21n) such as the AAL2 receiving end 21a, the AAL2 receiving end 21a separates the CPS packet from the AAL2 packet in step S51. From step S51, control continues to step S53, where a new VPVC and a routing tag are allocated, for example in the first table 24, based on the VPVC and CID of the AAL2 packet. From step S53, control continues to step S55.

In step S55, the AAL2 receiving end can store the CPS packet based on the VPVC and CID using Table 1 in the corresponding memory (i.e., storage areas). At this time, storage areas can preferably be pre-allocated in the memory (e.g., memory 22a) corresponding to the number of the output ports. Each of storage areas in the memories 22a-22n can include a memory status field, a copy port field, and a port area. However, the present invention is not intended to be so limited. Based on the routing information, it is determined in step S55 whether the CPS packet is stored in any corresponding storage area in the storage areas of the memory 22a, and accordingly, the CPS packet and the new VPVC can be stored in the corresponding storage area.

At this time, when the CPS packet is stored in a corresponding storage area of the memory 22a or the like, the memory status field of the corresponding storage area is set at '1' or a prescribed value. Further, when the CPS packet is for multicast, not only the memory status field, but also the copy port field can be set at '1' or a prescribed value.

From step S55, control continues to step S57 where the AAL2 transmitting end 23a periodically searches the plurality of memories 22a-22n and extracts the searched CPS packet. Thus, one AAL2 transmitting end of the plurality of AAL2 transmitting ends 22a-22n transmitting end preferably can search the plurality of memories 22a-22n. While the AAL2 transmitting end (e.g., 23a) searches to discriminate whether the internal memory status fields are set at '1' or not based on the plurality of memories 22a-22n, the AAL2 transmitting end 23a extracts the corresponding CPS packet when determining that a memory status field is set at the prescribed value such as '1'. If the CPS packet is for multicast, since the bit corresponding to the copy port field of the object port for transmitting is also set at '1', the AAL2 transmitting ends also have to search a corresponding bit of the copy port field. If the bit corresponding to the copy port field is set at '1',it is determined whether the output port is coupled to the searching AAL2 transmitting end (e.g., AAL2 transmitting end 23a) itself. For example, if the bit corresponding to the copy port field set at '1' is the port connected with the AAL2 transmitting end 23a, at this time the AAL2 transmitting end 23a extracts the CPS packet stored in the port area corresponding to the bit set at '1'. Further, when the CPS packet is extracted, the new VPVC can also be extracted together with the CPS packet.

The CPS packet extracted through the above-described searching process performed in step S57 is input to the AAL2 transmitting end 23a and converted into the AAL2 packet by multiplexing the CPS packet, and the AAL2 packet can be transmitted through the output port in step S59. Here, the 'multiplex' means a combination of the plurality of CPS packets extracted from the respective memories 22a-22n by the AAL2 transmitting end such as the AAL2 transmitting end 23a. The new VPVC, which is extracted together with the CPS packets, can be generated, and a new CID can be allocated based on the new VPVC, for example, using the second table 25. Accordingly, the AAL2 packet is transmitted based on the new VPVC and the new CID.

As described above, preferred embodiments of an AAL2 switch and switching method according to the present invention have various advantages. In the preferred embodiments of an AAL2 switch and switching method, the CPS packets separated from the ATM cell are stored in a predetermined position of the memory according to the routing tag, and the transmitting ends search the respective memories to discriminate whether there is the CPS packet to be transmitted to the output port. Accordingly, a higher rate switching can be performed by an AAL switch, and a multicast function can be extended to and performed at the AAL level. Further, the traffic efficiency rate can be greatly increased to a level that enables the provision of efficient multicast services in third generation (3-G) technology, such as video conference in the IMT-2000 system and video-on-demand (VOD), or the like.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An AAL2 switch for multicast, comprising:
a plurality of receiver circuits each receiving and demultiplexing an AAL2 packet for conversion into at least one common part sublayer (CPS) packet;
a plurality of memories configured to store CPS packets, said at least one CPS packet stored in one of the memories at a predetermined address indicated by a routing tag allocated to said at least one CPS packet by a corresponding one of the receiver circuits; and
a plurality of transmitter circuits each coupled to the plurality of memories to search the plurality of memories, convert the searched CPS packet into an AAL2 packet, and transmit the AAL2 packet,
wherein said one memory stores information indicating that said at least one CPS packet is to be multicast through two or more transmitter circuits and wherein the two or more transmitter circuits search the memories to locate the multicast information and transmit the AAL2 packet based on the search results.

2. The AAL2 switch for multicast of claim 1, comprising:
a first table, coupled to each of the plurality of receiver circuits, for managing virtual path virtual channel (VPVC), channel identifier (CID) and the routing tag; and
a second table, coupled to each of the plurality of transmitter circuits, for managing storing conversion information including the VPVC and the CID.

3. The AAL2 switch for multicast of claim 1, wherein a new virtual path virtual channel (VPVC) and the routing tag for said at least one CPS packet are allocated based on a VPVC and a channel identifier (CID) in the received AAL2 packet.

4. The AAL2 switch for multicast of claim 3, wherein said at least one CPS packet and the new VPVC are stored at the predetermined address indicated by the routing tag.

5. The AAL2 switch for multicast of claim 1, wherein addresses for storing CPS packets in each of the memories are allocated to correspond to output ports coupled to the transmitter circuits.

6. The AAL2 switch for multicast of claim 1, wherein each memory area allocated for storing CPS packets includes:
   a memory status field that stores information indicating whether a CPS packet is stored in said area,
   a copy port field that stores information indicating whether the stored CPS packet is to be multicast through two or more of the transmitter circuits, and
   a port area that stores the CPS packet with a new virtual path virtual channel (VPVC) generated for the stored packet based on at least one of a VPVC or a channel identifier (CID) of a received AAL2 packet.

7. The AAL2 switch for multicast of claim 1, wherein the transmitter circuits each performs the searching process according to values set in a memory status field in the plurality of memories.

8. The AAL2 switch for multicast of claim 7, wherein the transmitter circuits perform the searching process according to values set at a copy port field.

9. The AAL2 switch for multicast of claim 1, wherein when said at least one CPS packet is searched, the transmitter circuits generate a new channel identifier (CID) for the searched CPS packet by using a new virtual path virtual channel (VPVC) generated for said at least one CPS packet.

10. The AAL2 switch for multicast of claim 1, wherein each of the memories have predetermined address which correspond in number to a number of output ports coupled to the transmitter circuits, said predetermined addresses storing CPS packets received from corresponds ones of the receiver circuits.

11. A switching method of an AAL2 switch for multicast, the method comprising:
   converting a received AAL2 packet into a common part sublayer (CPS) packet by demultiplexing the received AAL2 packet;
   generating a new virtual path virtual channel (VPVC) and routing information based on VPVC and channel identifier (CID) in the received AAL2 packet;
   storing the CPS packet and the new VPVC according to the routing information, the routing information indicating one or more predetermined storage areas in a memory allocated for storing the CPS packet; and
   extracting the CPS packet by searching the plurality of storage areas; and
   transmitting an AAL2 packet by converting the extracted CPS packet into an AAL2 packet and transmitting the AAL2 packet, wherein at least one memory stores an indication that said at least one CPS packet is to be multicast through two or more transmitter circuits, and wherein a subset of transmitter circuits transmit said AAL2 packet for multicast responsive to said indication, and wherein said received AAL2 packet is received by a single receiver circuit.

12. The switching method of claim 11, wherein the converting through transmitting steps are repeatedly performed whenever the received AAL2 packet is inputted.

13. The switching method of claim 11, wherein a memory status field of the storage area indicates whether the CPS packet is stored.

14. The switching method of claim 11, an output port where the CPS packet is sent is indicated in a copy port field of the storage area.

15. The switching method of claim 11, wherein the CPS packet and the new VPVC information is stored in at least a port area of the storage area.

16. The switching method of claim 11, wherein if the CPS packet is extracted, a new CID is generated by using a new VPVC.

17. A switching method of an AAL2 switch for multicast, the method comprising:
   converting a received AAL2 packet into a common part sublayer (CPS) packet by demultiplexing the received AAL2 packet;
   storing the CPS packet according to a routing information, the routing information indicating a predetermined memory address allocated for storing the CPS packet;
   converting the stored CPS packet into an AAL2 packet, wherein the stored CPS packet contains a field configured to indicate multicast transmission using a two or more of a plurality of output ports of the AAL2 switch; and
   transmitting the AAL2 packet to a plurality of different destinations using said two or more output ports according to said field.

18. The switching method of claim 17, wherein the routing information is generated based on a virtual path virtual channel (VPVC) and a channel identifier (CID) of the received AAL2 packet, and wherein a new VPVC is generated and stored based on the VPVC and the CID.

19. The switching method of claim 17, wherein the received AAL2 packet is received through a single one of a plurality of input ports of the AAL2 switch.

20. The switching method of claim 17, further comprising periodically searching for a memory status field and a copy port field corresponding to each of a plurality of output ports.

21. The switching method of claim 20, wherein the converting the stored CPS packet into the AAL2 packet extracts the corresponding to an output port where the CPS packet is allocated by the periodically searching.

* * * * *